(12) United States Patent
Elizondo (10) Patent No.: US 6,917,813 B2
(45) Date of Patent: Jul. 12, 2005

(54) PROVISION OF SHORT MESSAGE SERVICES

(75) Inventor: Alejandro A. Elizondo, Coahuila (MX)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 432 days.

(21) Appl. No.: 09/872,877

(22) Filed: May 31, 2001

(65) Prior Publication Data

US 2002/0183081 A1 Dec. 5, 2002

(51) Int. Cl.⁷ .............................................. H04Q 7/20
(52) U.S. Cl. .................... 455/466; 455/412.2; 455/433; 455/435.1
(58) Field of Search ................................. 455/466, 433, 455/435.1, 435.2, 439, 432.2, 43, 412.1, 412.2, 404.2, 414.2, 414.3, 432.1, 432.3, 461, 445, 426, 419, 415, 435, 1; 370/401, 353, 356

(56) References Cited

U.S. PATENT DOCUMENTS

| | | | | |
|---|---|---|---|---|
| 5,610,972 A | * | 3/1997 | Emery et al. ............... | 455/445 |
| 5,629,974 A | * | 5/1997 | Rajala et al. ............... | 455/466 |
| 5,867,788 A | * | 2/1999 | Joensuu ....................... | 455/445 |
| 5,878,347 A | * | 3/1999 | Joensuu et al. ............. | 455/433 |
| 5,946,630 A | | 8/1999 | Willars ....................... | 455/466 |
| 6,097,960 A | * | 8/2000 | Rathnasabapathy et al. | 455/461 |
| 6,097,962 A | * | 8/2000 | Corriveau et al. .......... | 455/466 |
| 6,311,057 B1 | * | 10/2001 | Barvesten ................... | 455/415 |
| 6,363,431 B1 | * | 3/2002 | Hammer et al. ......... | 455/435.1 |
| 6,459,904 B1 | * | 10/2002 | Lorello et al. .............. | 455/466 |
| 6,463,055 B1 | * | 10/2002 | Lupien et al. .............. | 370/353 |
| 6,515,985 B2 | * | 2/2003 | Shmulevich et al. ....... | 370/356 |
| 6,515,997 B1 | * | 2/2003 | Feltner et al. .............. | 370/401 |
| 6,577,723 B1 | * | 6/2003 | Mooney ....................... | 455/433 |
| 6,591,098 B1 | * | 7/2003 | Shieh et al. ................ | 455/419 |
| 6,625,461 B1 | * | 9/2003 | Bertacchi .................... | 455/466 |
| 6,662,017 B2 | * | 12/2003 | McCann et al. ........... | 455/461 |
| 6,718,178 B1 | * | 4/2004 | Sladek et al. ............... | 455/466 |
| 6,731,926 B1 | * | 5/2004 | Link et al. ............... | 455/412.2 |

FOREIGN PATENT DOCUMENTS

WO    WO 98/56195    12/1998

* cited by examiner

*Primary Examiner*—CongVan Tran (57) ABSTRACT

This invention relates to a method and apparatus to provide Short Message Services (SMS) provisioning when different SS7 signaling networks are in use. The method can be used when mobile units are roaming in a SS7 network different than the MS home network, and when the MS is roaming inside or outside of its SS7 type of network.

The HLR, which includes a memory for storing a database of point code schemes and country codes, also stores all location data for the MSC including the SMS Address and the MSCIN. The HLR analyzes the SMS Address to determine the nationality of the MSC. The HLR compares the MSC's REGNOT point code and MSCIN country code with the country code in the MC's SMSREQ calling party address to determine whether the MC and MSC point codes are the same. If they are the same, the smsreq is populated with the common point code from the SMS Address. If not the same, the smsreq is populated with the MSCIN parameter.

11 Claims, 6 Drawing Sheets

PROVISION OF SHORT MESSAGE SERVICES

BACKGROUND OF THE INVENTION

1. Technical Field

This invention relates generally to Short Message Service operations in mobile cellular telecommunication networks. More particularly, this invention relates to a method to provide Short Message Service (SMS) services to mobile units roaming in a Signaling System #7 (SS7) network different from the Mobile Station (MS) home network.

2. History of Related Art

The Short Message Service (SMS) provides a means of sending text messages, containing up to 160 alphanumeric characters, to and from mobile stations. SMS makes use of a Message Center (MC), which acts as a store and forward center for short messages. The performance of different telecommunication network entities during an SMS operation is described in the American National Standards Institute (ANSI)-41 telecommunications standard, including the SMS Delivery Point to Point (DPTP) operation. This operation is defined as "a general purpose operation that is used to convey a short message or in general any other information or encapsulated data from one point to another point and report on the success or failure of that transfer."

When a MS registers at a Mobile Switching Center-Visitor Location Register (MSC-VLR), the MSC-VLR sends a Registration Notification Invoke (REGNOT) message to the Home Location Register (HLR). This message contains the address of the MSC currently serving the MS. This information is used by the HLR to find the MS. The MSC-VLR may provide the following ANSI-41 parameters in the REGNOT message: Point Code-Subsystem Number (PC-SSN), MSCIdentification (MSCID), MSCIdentificationNumber (MSCIN), and the SMS Address. Additionally, the Signaling Connection Control Part (SCCP) address information, such as Point Code or Global Title Address (GTA), may be used by the HLR to locate the MS.

When a Short Message Entity (SME) receives a request to deliver an SMS, the SME sends the SMSDPTP Invoke message to the MC. When the destination of the Short Message is a MS, the MC requests the address of the serving MSC from the HLR. This may be accomplished using an ANSI-41 SMS Request Invoke (SMSREQ) message. Since the HLR already has the information regarding the MS location, it will respond to the SMSREQ message with the serving MSC Address. The address of the serving MSC (SMSC) is provided to the MC in the SMS Request Return Result (smsreq) in the ANSI-41 parameter "SMS Address."

This SMS Address may be the SMS Address parameter received in response to the REGNOT message, or the PC SSN, or the MSCID translated into a PC SSN, or even the lower layer SCCP information received during registration. With such information, the MC is able to send the SMS to the MSC, and the MSC forwards it to the MS via air interface, (typically TDMA or CDMA). The HLR can also provide the MS's Serving MSC Address using a SMS Notification (SMSNOT) message. This message is used when the MS is inactive at the time the HLR receives a SMSREQ message.

The preferred way to provide the SMS Address in the smsreq message is for the HLR to use the same SMS Address parameter received at REGNOT. Currently, the use of alternate addresses such as the MSCID, the PC-SSN, or the MSCIN to provide the SMS Address has disadvantages. For example, using the MSCID received during registration requires translation to a point code by the HLR, so its use may not be recommended. Using the PC-SSN parameter, or the lower layer address, may point to the VLR instead of the MSC when the MSC and VLR are different entities, thus creating confusion. Finally, the MSCIN parameter is not currently used by the HLR for SMS purposes, and is mainly used to let the HLR know that the MSC is International Roaming capable.

The SMS Address parameter has been modified in various usage standards, and it is suggested to use an E.212 address (taken from the International Telecommunication Union (ITU) Recommendation E.212 "International Identification Plan for Mobile Terminals and Mobile Users", incorporated herein by reference in its entirety) for international SMS message routing, and either an SS7 point code address or an E.212 address for national scenarios. When the MSC determines that the MS is roaming into a different SS7 network, the MSC may include its own E.212 address number in the SMS Address parameter in the REGNOT message. In this case, the HLR will populate the same SMS Address in the smsreq response message. This method is efficient for an international scenario, that is, when the MSC and MC are not connected by a common national signaling point code addressing scheme (i.e., utilize a different SS7 network type).

However, to provide SMS services to a national MS roaming in a different SS7 network, the MSC is required to provide the SMS Address with a Global Title Address (GTA) during registration, i.e., an E.212 GTA or E.164 (the ITU Recommendation E.164 "The International Public Telecommunication Numbering Plan", incorporated herein by reference in its entirety) GTA identifier, or a combination of these two identifiers. When a national roaming MS registers with the MSC, the MSC will typically provide a PC address in the SMS Address parameter in the REGNOT message (or the smsreq response). The HLR will store this address and provide it when a MC requests the address. However, a problem with this scenario occurs if the MC that issues the SMSREQ is in a different SS7 network type than the HLR (and therefore the S-MSC). The smsreq response from the HLR will include a PC in the SMS address provided by the MSC that is not recognized by the MC as the intended SMS address. Therefore, the SMSDPTP operation will not be possible.

Therefore, what is needed is a method which allows the HLR to determine the proper address for the MSC (or VLR) serving the roaming MS when requested by an external node. This method should enable communication between the external node and the MS, MSC, or VLR, so as to provide proper addressing of SMS services to MSs roaming in an SS7 network that is different from the MS home network, and SMS reception from SS7 networks not being used by the MS.

SUMMARY OF THE INVENTION

The present invention relates to a method and apparatus to provide SMS services when different SS7 signaling networks are in use, both for SMS termination to mobile units roaming in an SS7 network different than the MS's home network, and for receiving SMS messages from an SS7 network different from the MS network when the MS is roaming inside or outside of its home SS7 network.

The HLR must store all relevant information related to the location of the MS, including the SMS Address and the MSCIN. The HLR must have the ability to determine which address needs to be provided to the requesting node. The SMS Address received at REGNOT will most probably contain a PC. For example, the REGNOT message contains a PC and the MSCIN, which in turn contains a country code. According to the method of the present invention, the HLR first analyzes the SMS Address for its country of origin to determine whether it is national or international. The HLR compares the MSCIN country code with the country code in the GTA provided in the calling party address of the MC (i.e., in the SMSREQ message) to determine whether the same point code scheme is used. The country codes do not need to be the same and some countries have more than one country code. If the country code is not present, it can be assumed by the HLR that the MC is in the same country (or region) as the HLR.

Absence of a MSCIN indicates that the roaming MS is national, since all international SMS addresses have a MSCIN. However, the MSC sometimes sends the MSCIN with a national roaming MS, even though it is not necessary. For a national roaming MS, the smsreq response is populated with the common point code from the SMS Address, because the SMS Address will not have a GTA. Usually, the SMS Address will have a PC or GTA if international, and only a PC if national. The HLR has a database of country code and point code schemes [e.g., in ANSI-41 or International Telecommunication Union (ITU) Q.708 format, both incorporated herein by reference in their entirety] and knows the location of the MS and the external requesting node. The present invention allows the HLR to determine the proper address from this database for the MSC or VLR serving the MS when requested by an external node. In turn, this information enables the external node to easily address and communicate with the MS, MSC or VLR.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
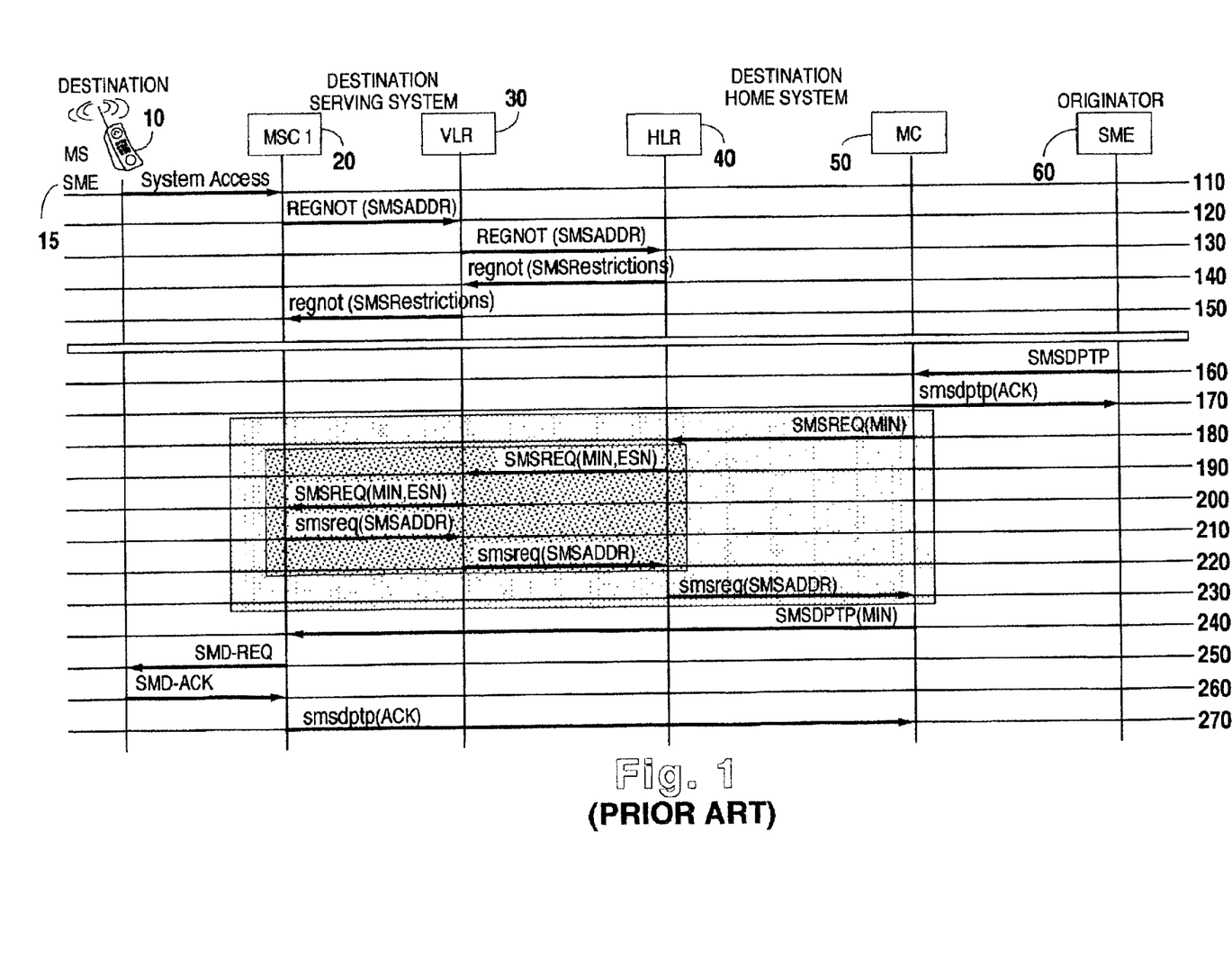
FIG. 1 is a prior art signal flow diagram illustrating the activity of different network entities during an SMS message delivery operation as defined in the ANSI-41 standard.

FIG. 1 illustrates a prior art signal flow diagram illustrating the activity of different network entities during a SMS Delivery Point to Point operation as defined in the ANSI-41 standard. During this operation, a short message, encapsulated data, or other information is conveyed from one point to another, with a subsequent report on the success or failure of the transfer. A MS 10 supporting a SME 15 becomes known to a MSC 20 via registration or other system access in step 110. The MSC 20 sends a REGNOT message to notify the VLR 30 of the location of a MS 10 in step 120. The VLR 30 forwards the REGNOT message to the MS's 10 HLR 40 in step 130. The HLR 40 records the SMS delivery address for the MS 10 and sends a regnot response to the VLR 30 containing subscriber profile information in step 140. The VLR 30 forwards the regnot response to the serving MSC 20 in step 150.

The MC 50 then receives and accepts a SMSDPTP message requesting delivery of a SMS message from a MS-based SME 60 in step 160. The MC 50 responds with a smdptp positive acknowledgment (which may contain a SMS_BearerData parameter if there is bearer data to return) in step 170. Because the MC 50 does not have a current, temporary SMS routing address and status for the addressed MS-based SME 15, the MC 50 sends a SMSREQ message to the HLR 40 serving the MS 10 which contains the Mobile Identification Number (MIN) for the MS 10 associated with the SME 15 in step 180. If the HLR 40 does not have a current temporary SMS routing address and status for the addressed MS-based SME 15, the HLR 40 forwards the SMSREQ message to the VLR 30 serving the MS 10 in step 190. The VLR 30 forwards the SMSREQ message to the MSC 20 serving the MS 10 in step 200. The MSC 20 sends a smsreq response containing the temporary SMS routing address for the served MS 10 in step 210. The VLR 30 forwards the smsreq response to the HLR 40 in step 220. The HLR 40, in turn, sends the smsreq response to the MC 50 in step 230.

The destination MC 50 forwards the SMDPTP to the destination MSC 20 using the temporary SMS routing address for the MS-based SME 15 in step 240. The MSC 20 sends a SMS Air Interface Delivery (SMD) REQUEST to the destination SME 15 using the air interface address of the MS-based SME 15 in step 250. The destination SME 15 responds with an automatic acknowledgment (SMD-ACK) which may include the SMS_BearerData parameter if there is data to return in step 260. The MSC 20 translates the SMD-ACK into a smdptp positive acknowledgment and returns it to the source of the corresponding SMDPTP in step 270. The smdptp may include a SMS_BearerData parameter if bearer data was provided in the destination SME 15 response.

Figure 2:
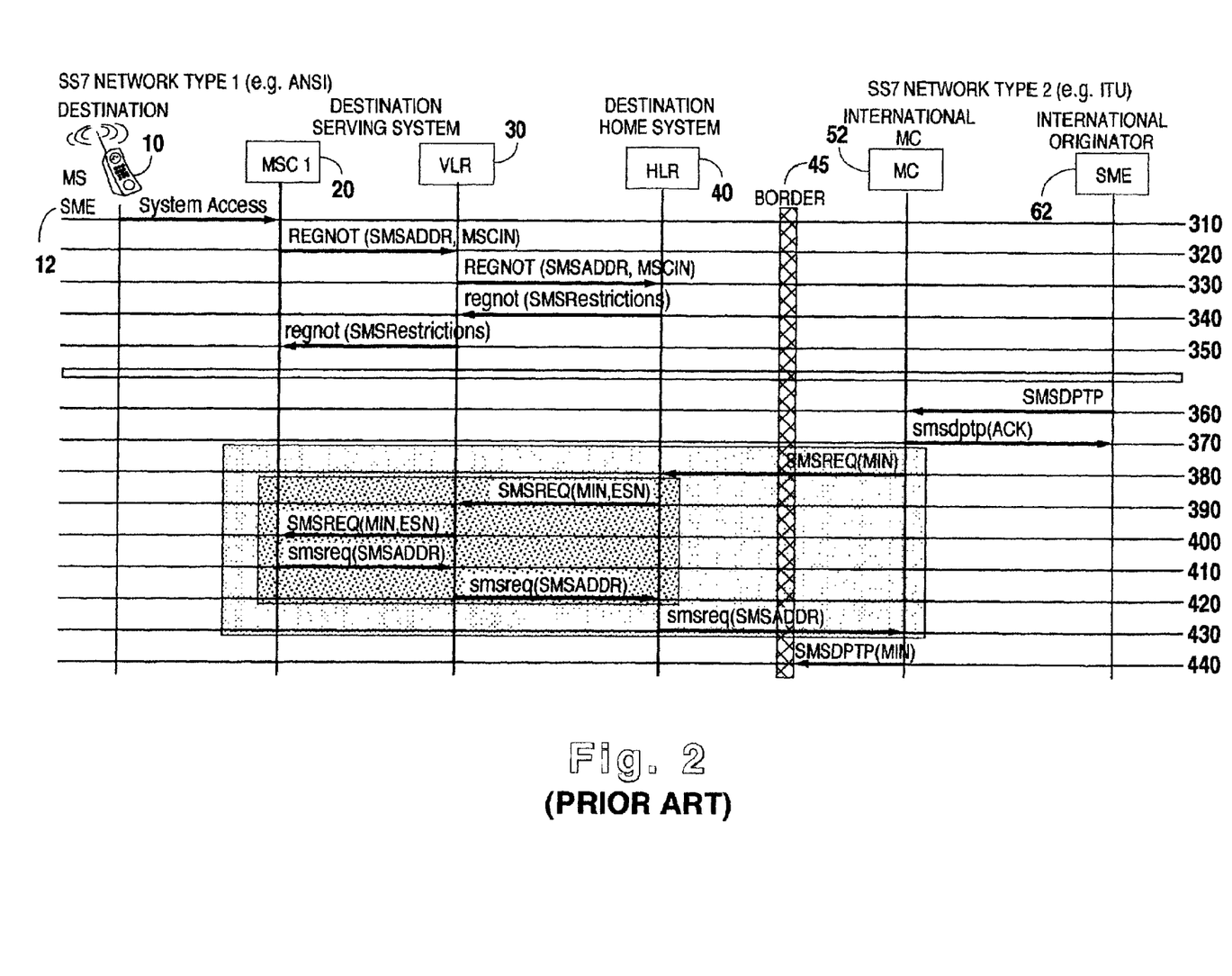
FIG. 2 is a prior art signal flow diagram illustrating successful SMS message delivery from a MC in a different SS7 network (international MC)

FIG. 2 is a prior art signal flow diagram illustrating unsuccessful SMS message delivery from a MC 52 residing in a different SS7 network (i.e., international MC). A MS 10 supporting a SME 12 becomes known to a MSC 20 via registration or other system access in step 310. The MSC 20 sends a REGNOT message to notify the VLR 30 of the location of the MS 10 in step 320. The VLR 30 forwards the REGNOT message to the MS's 10 HLR 40 in step 330. The HLR 40 records the SMS delivery address for the MS 10 and sends a regnot response to the VLR 30 containing subscriber profile information in step 340. The VLR 30 forwards the regnot response to the serving MSC 20 in step 350.

The MC 52 then receives and accepts a SMDPTP message from an international originator SME 62 requesting delivery of a SMS message to the MS-based SME 12 that is from a different SS7 network in step 360. The MC 52 responds to the originator SME 62 with a smdptp positive acknowledgment (which may include a SMS_BearerData parameter if there is bearer data to return) in step 370.

If the MC 52 does not have a current, temporary SMS routing address and status for the addressed MS-based SME 12, the MC 52 then sends a SMSREQ message to the HLR 40 serving the MS 10, containing the MIN for the MS 10 associated with the SME 12 in step 380. In FIG. 2, the Border MSC 45 is used as a SS7 gateway, translating the GTA provided in the Calling and Called Party Addresses to allow communication between the two different SS7 systems. If the HLR 40 does not have a current, temporary SMS routing address and status for the addressed MS-based SME 12, the HLR 40 forwards the SMSREQ message to the VLR 30 serving the MS 10 in step 390. The VLR 30 forwards the SMSREQ message to the MSC 20 serving the MS 10 which contains the addressed SME 12 in step 400. The MSC 20 responds with a smsreq response containing the temporary SMS routing address for the served MS 10 in step 410, this address contains the PC of the Serving MSC (S-MSC) 20. The VLR 30 forwards the smsreq response to the HLR 40 in step 420, and the HLR 40 forwards the smsreq response to the MC 52 in step 430.

The Border MSC 45 translates the SCCP Global Title Addresses provided in the Called and Calling Party Address, and the destination MC 52 forwards the SMDPTP message to the destination SME 12 using the temporary SMS routing address for the MS-based SME 12 in step 440.

Since the routing of the SMSDPTP is done using Point Codes, and since the S-MSC 20 and the MC 52 are in different SS7 network types, the SMSDPTP is discarded by the Border MSC 45 (i.e., the gateway only translates GTA information).

Figure 3:
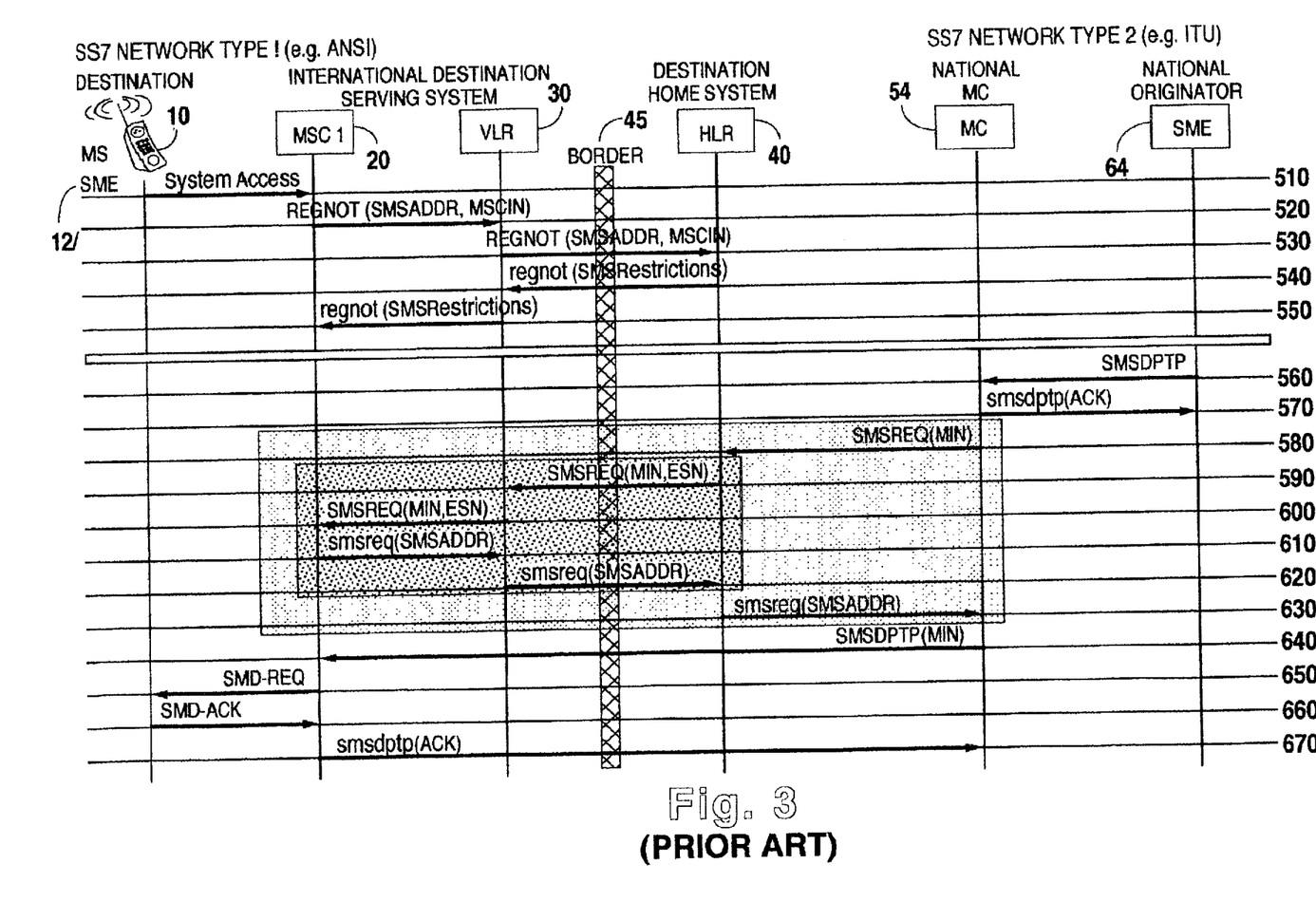
FIG. 3 is a prior art signal flow diagram illustrating unsuccessful SMS message delivery to a MS roaming in a different SS7 network (national MC)

FIG. 3 illustrates successful prior art SMS message delivery to a MS 10 roaming in a different SS7 network type (i.e., national MC). A MS 10 supporting a SME 12 becomes known to a MSC 20 via registration or other system access in step 510. The MSC 20 sends a REGNOT message to notify the VLR 30 of the location of the MS 10 in step 520. The VLR 30 forwards the REGNOT message to the MS's HLR 40 that is in a different SS7 network in step 530. This REGNOT message is sent using GTA so that the Border MSC 45 is able to translate the SCCP message header from one format to the other. The HLR 40 records the SMS delivery address for the MS 10 and responds with a regnot response to the VLR 30 containing subscriber profile information in step 540. The regnot response is sent using GTA so that the Border 45 is able to translate the SCCP message header from one format to the other. The VLR 30 forwards the regnot response to the serving MSC 20 in step 550.

The MC 54 then receives and accepts a SMDPTP from a national originator SME 64 requesting delivery of a SMS message to the MS-based SME 12 for the MS 10 that is roaming in a different SS7 network in step 560. The MC 54 responds with a smdptp positive acknowledgment (which may include a SMS_BearerData parameter if there is bearer data to return) to the originator SME 64 in step 570.

If the MC 54 does not have a current, temporary SMS routing address and status for the addressed MS-based SME 12, the MC 54 sends a SMSREQ message to the HLR 40 serving the MS 10 which contains the addressed SME 12 in step 580. If the HLR 40 does not have a current temporary SMS routing address and status for the addressed MS-based SME 12, the HLR 40 forwards the SMSREQ message to the VLR 30 serving the MS 10 which contains the addressed SME 12 in step 590. The VLR 30 then forwards the SMSREQ message to the MSC 20 serving the MS 10 which contains the addressed SME 12 in step 600. The MSC 20 responds with a smsreq response containing the temporary SMS routing address for the served MS 10 in step 610, and the VLR 30 forwards the smsreq response to the HLR 40 in step 620. The HLR 40 then forwards the smsreq response to the MC 54 in step 630.

The destination MC 54 then sends a SMDPTP message toward the destination SME 12 using the temporary SMS routing address for the MS-based SME 12 (i.e., the GTA of the Serving MSC 20) in step 640. This is accomplished using GTA, so that the Border MSC 45 is able to translate from one SS7 format to another. The MSC 20 sends an SMD-REQUEST message to the destination SME 12 using the air interface address of the MS-based SME 12 in step 650. The destination SME 12 then responds with an automatic acknowledgment (SMD-ACK) in step 660, which may include the SMS_BearerData parameter if there is data to return. The MSC 20 translates the SMD-ACK into a smdptp positive acknowledgment and returns it to the source of the corresponding SMDPTP in step 670. The smdptp may include a SMS_BearerData parameter if bearer data was provided by the destination SME 12. The smdptp is sent using GTA.

Figure 4:
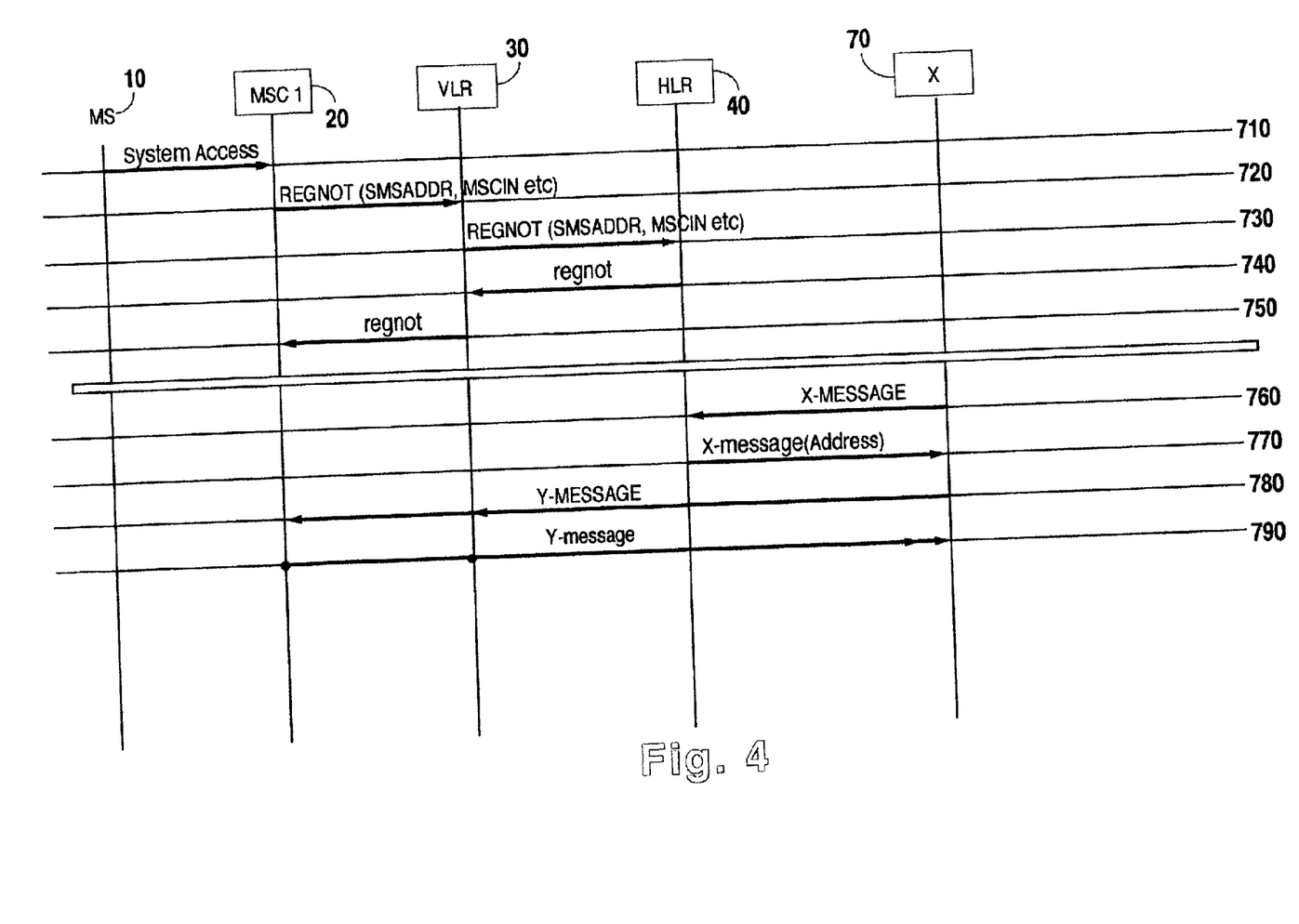
FIG. 4 is a signal flow diagram illustrating various message pathways used in implementing the method of the present invention.

FIG. 4 illustrates various message pathways used in implementing the method of the present invention. In general, the MS 10 accesses the telecommunication network at a node 20, such as a MSC 20, in step 710. The MSC 20 then sends a REGNOT message to the VLR 30 with its address information in step 720 (e.g., SMSADDR, MSCIN, etc.). The VLR 30 forwards the REGNOT message including the address information in step 730. The HLR 40 stores all the addresses that may be required by an external node, such as node X 70, and answers with a regnot response in step 740. The VLR 30 then forwards the response to the MSC 20 in step 750.

At some later time, an external node X 70 may require the address of the Serving MSC 20 or VLR 30 in step 760. The HLR 40 provides the proper address to the requesting node X 70 in step 770 based on its stored internal information and information acquired about the node requesting the address, including the location of the HLR 40, the location of the Serving MSC-VLR, and the location of the requesting node. The node X 70 may then send a message (e.g., Y-message) to the MSC 20 or VLR 30 where the MS 10 is registered. The Y-message is sent to the MSC 20 or VLR 30 in step 780 depending on the X-node 70 needs, using the address obtained in step 770. The MSC 20 or VLR 30 then responds to the node X 70 message in step 790.

Figure 5:
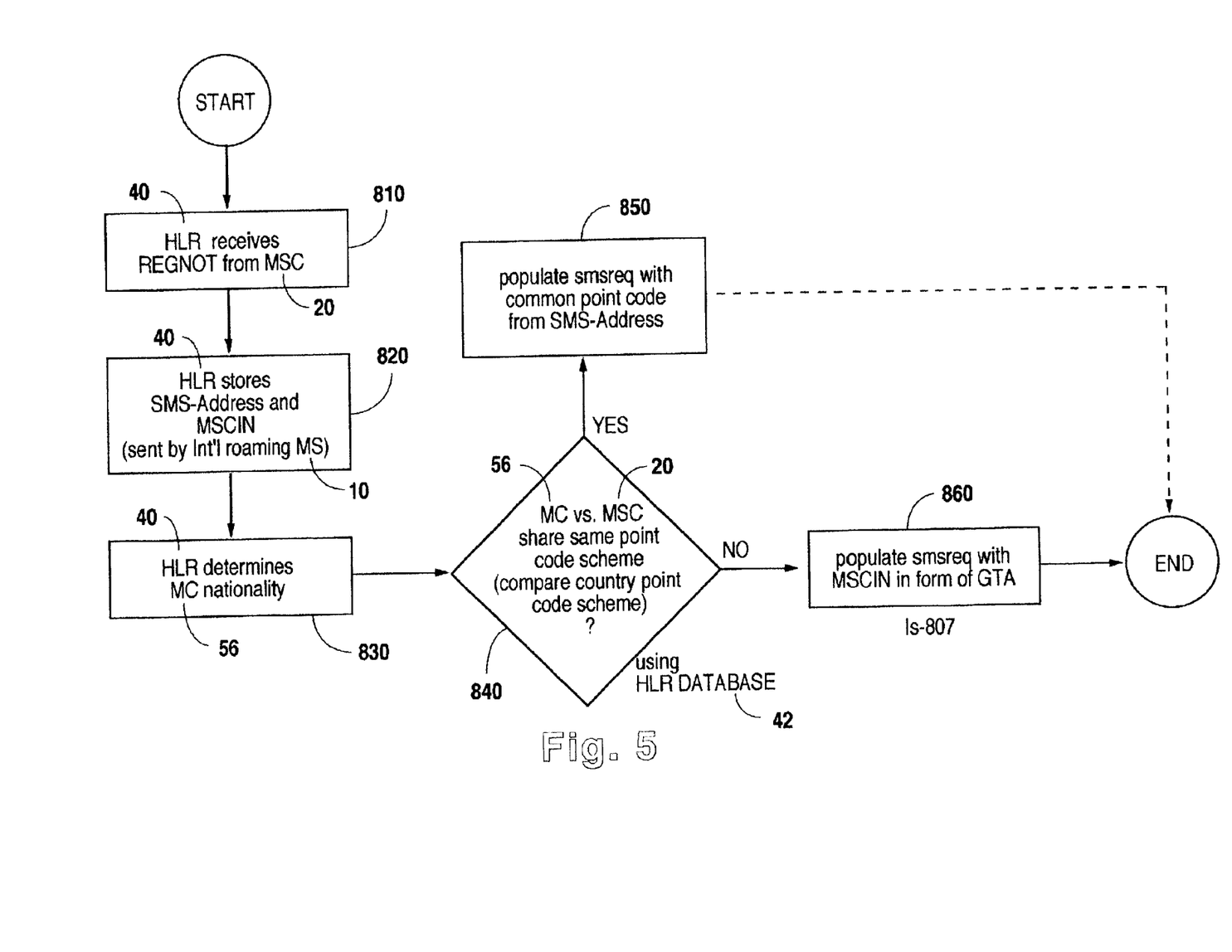
FIG. 5 is a flow chart illustrating the procedure utilized by the HLR to respond to a SMSREQ message for SMS service provision using the method of the present invention.

FIG. 5 illustrates the procedure utilized by the HLR 40 to complete the smsreq response for providing SMS services according to the present invention. The HLR 40 receives a REGNOT message from the MSC 20 in step 810. The HLR 40 then stores the SMS Address and MSCIN sent by an international roaming MS 10 in step 820. The HLR 40 determines the nationality of the MC 56 in step 830. Using the country code and point code scheme database 42 which is stored in a memory in the HLR 40, a determination is made as to whether the MC 56 and MSC 20 share the same point code scheme in step 840. If so, the HLR 40 populates the smsreq response with the common point code from the SMS Address in step 850. If not, the system populates the smsreq with the MSCIN in GTA format in step 860.

Figure 6:
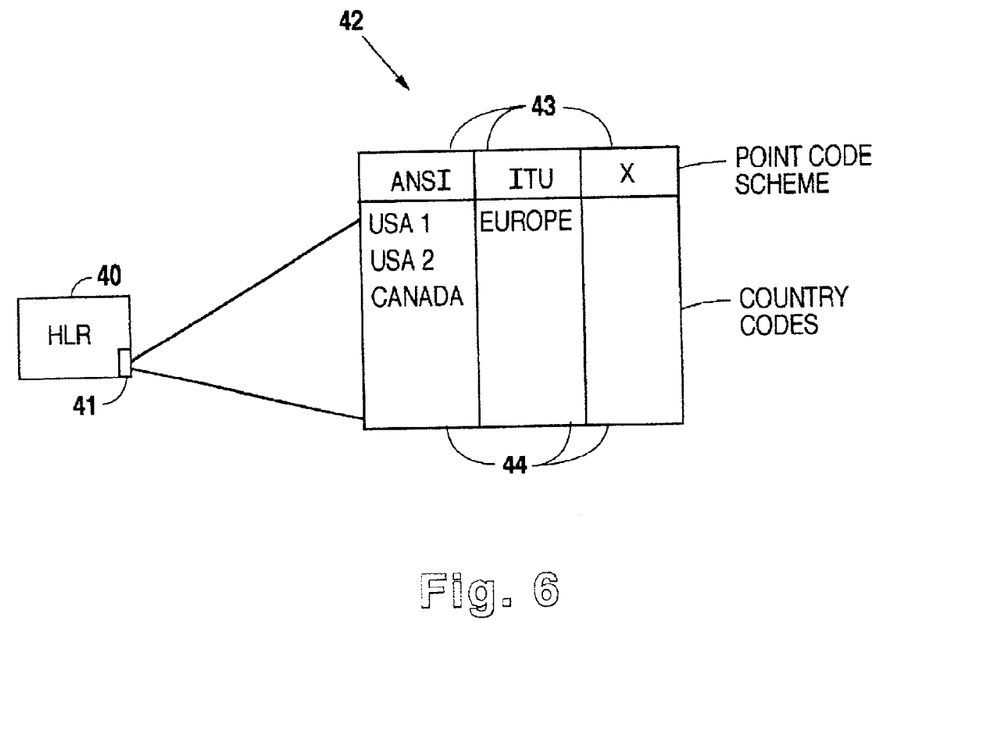
FIG. 6 is a diagram illustrating the invention as a node having a database of country codes and point code schemes stored in a memory.

FIG. 6 is a diagram illustrating the invention as a node (HLR) 40 with a database 42 including a plurality of country codes and a corresponding plurality of point code schemes contained within a memory 41. The database 42 includes point code schemes 43 such as ANSI and ITU, as well as the country codes 44 for each country. The HLR 40 utilizes this database 42 to compare the point code schemes for the MC 56 and the MSC 20 as previously described in FIG. 5.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method in a Home Location Register for Short Message Services (SMS) provisioning in a system including a Message Center (MC), and a Mobile Switching Center-Visitor Location Register (MSC-VLR), the method comprising the steps of:

receiving a Registration Notification (REGNOT) message, containing address information associated with a mobile station (MS), from the MSC-VLR, storing a SMS address and Mobile Switching Center Identification (MSCIN) of the MS;

comparing a country code in the MSCIN with a country code in a calling party address of the MC;

determining whether the MC and the MSC share a common point code scheme;

selectively populating a SMS Request Return Result (smsreq) relative to said REGNOT message with a common point code from the SMS address if the MSC and MC share the same point code schemes or populating said smsreq with the MSCIN if the MSC and MC do not share the same point code scheme; and forwarding said smsreq to said MC.

2. The method of claim 1, wherein the MSCIN parameter is in Global Title Address (GTA) format.

3. The method of claim 2, wherein said GTA format uses an E.212 identifier.

4. The method of claim 2, wherein said GTA format uses an E.164 identifier.

5. The method of claim 2, wherein said GTA format uses a combination of said E.212 and E.164 identifiers.

6. The method of claim 1, wherein said HLR has a database including at least one country code and at least one corresponding point code scheme.

7. The method of claim 6, wherein said point code scheme is specified according to American National Standards Institute (ANSI) standard-41.

8. The method of claim 6, wherein said point code scheme is specified according to International Telecommunication Union (ITU) standard Q.700.

9. The method of claim 6, wherein the step of comparing the MC point code scheme with the MSC point code scheme occurs in said database in said HLR.

10. The method of claim 1, wherein the step of determining the MC point code scheme further includes the step of determining a nationality of the MC.

11. A home location register (HLR) in a system further comprising a Messaging center (MC), a Mobile Switching Center, the HLR comprising:

a database for storing a Short Message Service address and Mobile Switching Center Identification (MSCIN) of a Mobile Station;

receiver means for receiving a request from said Messaging Center to deliver a SMS message to said MSC and for receiving a Registration Notification (REGNOT) message from the MSC-VLR containing address information associated with a mobile station (MS), means for comparing a country code in the MSCIN with a country code in a calling party address of the MC;

means for determining whether the MC and the MSC share a common point code scheme;

means for selectively populating a SMS request response (smsreq) relative to said REGNOT message with a common point code from the SMS address if the MSC and MC share the same point code schemes or populating said smsreq with the MSCIN if the MSC and MC do not share the same point code scheme; and means for forwarding said smsreq to said MC.

* * * * *